US012316719B2

(12) United States Patent
Badic et al.

(10) Patent No.: US 12,316,719 B2
(45) Date of Patent: *May 27, 2025

(54) DYNAMIC SERVICE DISCOVERY AND OFFLOADING FRAMEWORK FOR EDGE COMPUTING BASED CELLULAR NETWORK SYSTEMS

(71) Applicant: Apple Inc., Cupertino, CA (US)

(72) Inventors: Biljana Badic, Munich (DE); Christian Drewes, Munich (DE); Ralph Hasholzner, Munich (DE); Krisztian Kiss, Hayward, CA (US); Teck Yang Lee, Cupertino, CA (US); Matthias Sauer, Campbell, CA (US); Mikhail Vilgelm, Munich (DE); Babar Qaisrani, Los Altos, CA (US); Vijay Venkataraman, San Jose, CA (US); Robert Zaus, Neubiberg (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,489

(22) Filed: Apr. 8, 2024

(65) Prior Publication Data

US 2024/0259480 A1    Aug. 1, 2024

Related U.S. Application Data

(63) Continuation of application No. 17/439,481, filed as application No. PCT/US2020/065627 on Dec. 17, 2020, now Pat. No. 11,991,260.

(Continued)

(51) Int. Cl.
*H04L 67/59* (2022.01)
*H04L 67/51* (2022.01)
*H04W 4/50* (2018.01)

(52) U.S. Cl.
CPC .............. *H04L 67/59* (2022.05); *H04L 67/51* (2022.05); *H04W 4/50* (2018.02)

(58) Field of Classification Search
CPC ....... H04L 67/59; H04L 67/51; H04L 67/289; H04W 4/50

(Continued)

(56) References Cited

U.S. PATENT DOCUMENTS 8,244,874 B1 * 8/2012 Thireault .............. G06F 9/5055
709/226
10,440,096 B2 10/2019 Sabella
(Continued)

FOREIGN PATENT DOCUMENTS

CN    107466482    12/2017
CN    107682443    2/2018
(Continued)

OTHER PUBLICATIONS

Rahati-Quchani et al. "An Efficient Mechanism for Computation Offloading in Mobile-Edge Computing"; IEEE Transactions on Vehicular Technology; Sep. 15, 2019.

(Continued)

*Primary Examiner* — Don N Vo
(74) *Attorney, Agent, or Firm* — Kowert, Hood, Munyon, Rankin & Goetzel, P.C.

(57) ABSTRACT

A user equipment (UE) or other device performs service discovery of edge computing resources in a cellular network system and dynamic offloading of UE application tasks to discovered edge computing resources. As part of the discovery process, the device (e.g., the UE) may request edge server site capability information. When performing dynamic offloading, the UE may obtain (collect and/or receive) information regarding channel conditions, cellular network parameters or application requirements and (Continued)

dynamically determine whether a task of the application executing on the UE should be offloaded to an edge server or executed locally on the UE. In making decisions between offloaded or local execution, the UE may use a utility function that takes into account factors such as relative differences in application latency, energy consumption and offloading cost.

20 Claims, 13 Drawing Sheets

Related U.S. Application Data

(60) Provisional application No. 62/993,347, filed on Mar. 23, 2020.

(58) Field of Classification Search
USPC .............................................. 455/414, 414.1
See application file for complete search history.

(56) References Cited

U.S. PATENT DOCUMENTS

| | | | |
|---|---|---|---|
| 10,499,304 | B1 | 12/2019 | Stauffer |
| 2014/0095695 | A1 | 4/2014 | Wang |
| 2015/0365463 | A1* | 12/2015 | Quan ........................ G06F 8/61 709/219 |
| 2016/0162004 | A1* | 6/2016 | Ljubuncic ............. G06F 9/5083 713/320 |
| 2017/0164237 | A1 | 6/2017 | Mahmoodi |
| 2017/0185457 | A1 | 6/2017 | Sun |
| 2017/0351546 | A1 | 12/2017 | Habak |
| 2018/0183855 | A1 | 6/2018 | Sabella |
| 2018/0241836 | A1 | 8/2018 | Arsenault |
| 2019/0141120 | A1 | 5/2019 | Bernat |
| 2020/0076875 | A1 | 3/2020 | Sabella |
| 2021/0136142 | A1* | 5/2021 | Dong ..................... G06F 9/5094 |
| 2021/0182118 | A1* | 6/2021 | Sahin ................ H04W 52/0225 |

FOREIGN PATENT DOCUMENTS

| | | |
|---|---|---|
| CN | 108496341 | 9/2018 |
| CN | 109656703 | 4/2019 |
| CN | 109951880 | 6/2019 |
| JP | 2018536306 | 12/2018 |
| WO | 2017100640 | 6/2017 |
| WO | 2018031070 | 2/2018 |
| WO | 2018054195 | 3/2018 |
| WO | 2020023115 | 1/2020 |

OTHER PUBLICATIONS

Zhang et al. "Energy-Aware Offloading for Ultra-Dense Edge Computing"; 2018 IEEE Confs on Internet of Things, Green Computing and Communications, Cyber, Physical and Social Computing, Smart Data, Blockchain and Information Technology, Congress on Cybermatics; 2018.
Office Action for CN Application No. 202080098928.1; Jul. 28, 2023.
Office Action for JP Patent Application No. 2022-557137; Sep. 28, 2023.
Notice of Grant for CN Application No. 2020800989281; Jan. 18, 2024.
"Research on mobility management of mobile edge computing"; ZTE Technology Journal; 2018.
Sangolli et al. "Enabling High Availability Edge Computing Platform"; 2019 7th IEEE International Conference on Mobile Cloud Computing, Services and Engineering; 2019.

* cited by examiner

| Task Priority | Latency Requirements | Periodicity | Computational Complaxity | ... |

FIG. 9

DYNAMIC SERVICE DISCOVERY AND OFFLOADING FRAMEWORK FOR EDGE COMPUTING BASED CELLULAR NETWORK SYSTEMS

PRIORITY DATA

This application is a continuation of U.S. patent application Ser. No. 17/439,481, entitled "Dynamic Service Discovery and Offloading Framework for Edge Computing Based Cellular Network Systems," filed Sep. 15, 2021, which is a national phase entry of PCT Application No. PCT/US2020/065627, entitled "Dynamic Service Discovery and Offloading Framework for Edge Computing Based Cellular Network Systems," filed Dec. 17, 2020, claims priority to U.S. Provisional Patent Application No. 62/993,347, entitled "Dynamic Service Discovery and Offloading Framework for Edge Computing Based Cellular Network Systems," filed Mar. 23, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless devices, and more particularly to a system and method for improved discovery of/offloading to edge computing resources in a cellular network system.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

Despite the rapid technological evolution of mobile user equipment (UEs), computationally demanding applications on a smartphone or tablet are still constrained by limited battery capacity, thermal limits and device size and cost considerations. To overcome this problem, computationally complex processing can be offloaded to centralized servers, i.e., to the cloud. For example, Mobile Cloud Computing (MCC) refers to servers that provide cloud computing resources for mobile users. However, the use of MCC introduces significant communication delay. Such a delay is inconvenient and makes computational offloading unsuitable for real-time applications.

To solve this problem, the cloud service has been physically moved closer to users, i.e., toward the "edge" of the network. The concept of Multi-access Edge Computing (MEC), also referred to as "Mobile Edge Computing" or simply "Edge Computing." refers to an evolution of cloud computing that brings application hosting from centralized data centers down to the "network edge", i.e., physically closer to consumers and the data generated by applications. Edge computing is acknowledged as one of the key components for meeting the performance demands of modern cellular networks, such as 5G networks, especially with respect to reducing latency and improving bandwidth efficiency.

However, improvements in the field are desired.

SUMMARY OF THE INVENTION

Embodiments are presented herein of apparatuses, systems, and methods for a device, such as a UE, base station or server, to perform service discovery of edge computing resources in a cellular network system. Embodiments are also presented of a device which may perform dynamic offloading of UE application tasks to discovered edge computing resources.

According to the techniques described herein, a wireless device, such as user equipment (UE), comprises at least one antenna, a radio operably coupled to the antenna for communicating with a cellular network, a memory which stores an application, and a processor operably coupled to the radio. The application may have real-time requirements (or low latency requirements).

Prior to offloading tasks, the UE, base station, or another device may discover available edge server resources proximate to the UE. As part of the discovery process, the device (e.g., the UE) may request edge server site capability information. The edge serve site capability information may include information regarding computation capabilities of one or more edge servers, site load of the one or more edge servers, and latency between the UE and the one or more edge servers, among other possible information.

In performing the discovery, the device (e.g., the UE) may transmit an edge computing availability request to the cellular network. The request may include information identifying the UE and information identifying the application executing on the UE. The cellular network may receive this request and transmit an edge computing availability reply to the device. The availability reply may include information regarding available edger server networks and site capability information.

The UE may be configured to obtain (collect and/or receive) information regarding one or more of channel conditions, cellular network parameters or application requirements of the application executing on the UE, among other possible information. The UE may receive a portion or all of this information dynamically, e.g., while the UE is operating, or while the UE is executing the application.

The UE may also dynamically determine whether a task of the application executing on the UE should be offloaded to an edge server or executed locally on the UE. This determination may be based on the above information, e.g., on the channel conditions, cellular network parameters and/or application requirements. For example, in making this determination, the UE may compare the application quality of experience expected for offloaded task execution relative to the quality of experience expected for local task execution.

In some embodiments, the UE may calculate a utility function, wherein the utility function is based on one or more of the application latency or energy consumption associated with offloading the task and one or more of the application latency or energy consumption associated with performing the task locally on the UE. The utility function may also be based on an offloading cost, and possibly other information. The utility function may be a pre-determined function associated with the application or an application type of the application.

The UE may compute a value of the utility function based on at least a portion of the information and compare the value to a threshold. The comparison may indicate whether the task of the application should be offloaded to the edge server or executed locally on the UE. For example, the utility function may represent the difference between the utility or benefit (e.g., in terms of latency, energy consumption, etc.) of offloading the task to the edge server and the utility or benefit of executing the task locally on the UE. If the calculated difference in utility is greater than the threshold, then the task may be allocated for remote execution on the edge server. If the calculated difference in utility is less than the threshold, then the task may be executed locally on the UE. In some embodiments, the UE may use a first threshold value in determining whether to offload a task and use a second different threshold in determining whether to return an offloaded task back to the UE for local execution. This hysteresis may prevent the task from undesirably ping-ponging back and forth between remote and local execution.

The UE may transmit the application task for offloaded execution on the edge server in response to a determination by the UE that the task should be offloaded. When transmitting the task to the edge server for offloaded execution, the UE may also transmit a message including task parameters to one or more of the edge server or the cellular network. The task parameters may include two or more of task priority, latency requirements, periodicity or computational complexity, among other possible information. Alternatively, the UE may execute the task locally on the UE in response to a determination that the task should be executed locally on the UE.

In some instances, the UE may determine that the task cannot be executed on the edge server or locally on the UE due to one or more of bad channel conditions or insufficient power levels at the UE. When this occurs, the UE does not offload the task or execute it locally. Instead, the UE may generate information used to allocate networking and computing resources at a future time for execution of the task.

In some embodiments, the service discovery and offloading operations described above may be performed by an "Offloading Controller". The Offloading Controller may be implemented in the UE as described above. Alternatively, the Offloading Controller may be implemented in a cellular base station, a network element in the core network or a server outside of the core network, or possibly distributed among two or more of these.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

FIG. 9 illustrates task parameters that may be broadcast to the network and MEC servers by the Offloading Controller Unit, according to some embodiments;

Figure 1:
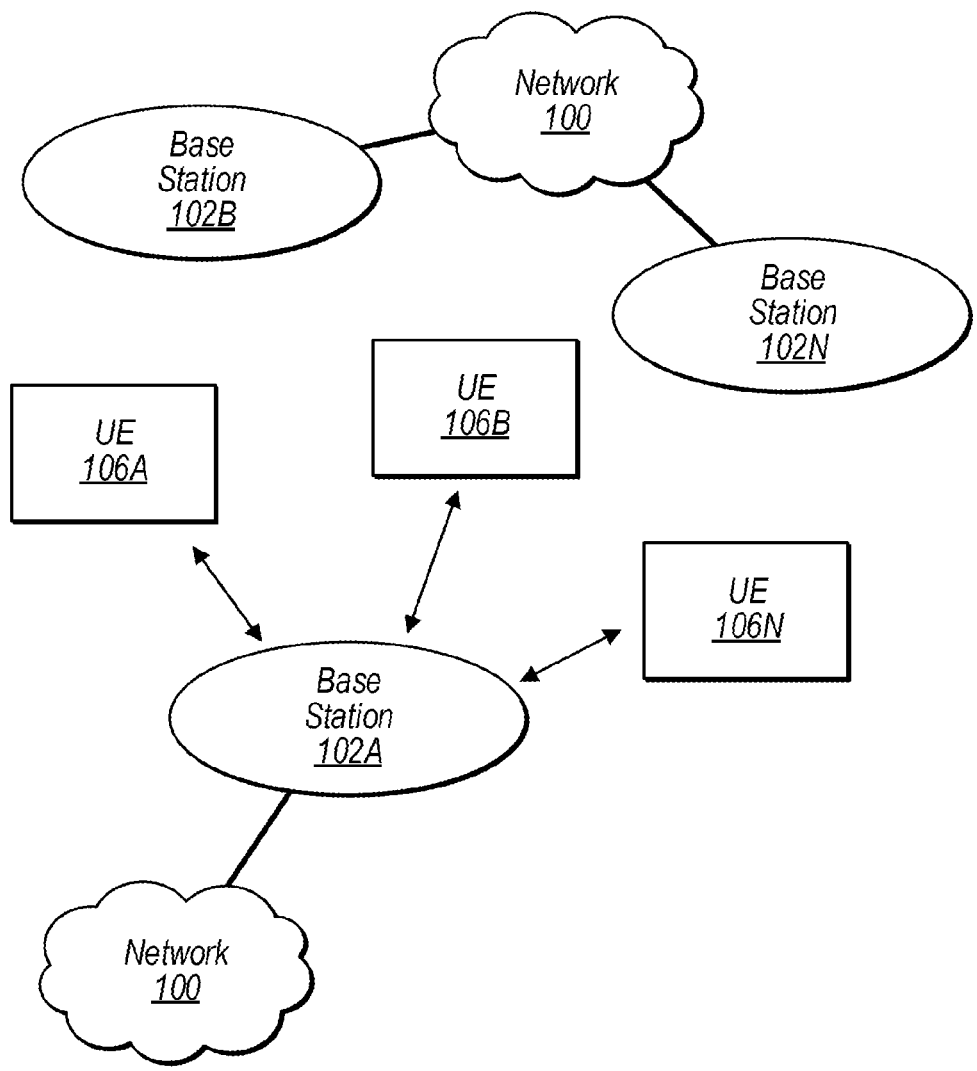
FIG. 1 illustrates an example (and simplified) wireless communication system according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

UE: User Equipment
RF: Radio Frequency
BS: Base Station
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
MCC: Mobile Cloud Computing
MEC: Multi-access Edge Computing (or Mobile Edge Computing)
OCU: Offloading Controller Unit
SDU: Service Discovery Unit
APU: Application Profile Unit
SPU: System Profile Unit
DSU: Decision and Scheduling Unit
IE: Information Element
AF: Application Function
UPF: User Plane Function
PCF: Policy Control Function
NEF: Network Exposure Function
LADN: Local Area Data Network
URSP: User Route Selection Policies
XR: Extended Reality
PUSCH: Physical Uplink Shared Channel
PDCCH: Physical Downlink Control Channel Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, unmanned aerial vehicles (UAVs), unmanned aerial controllers (UACs), vehicles, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
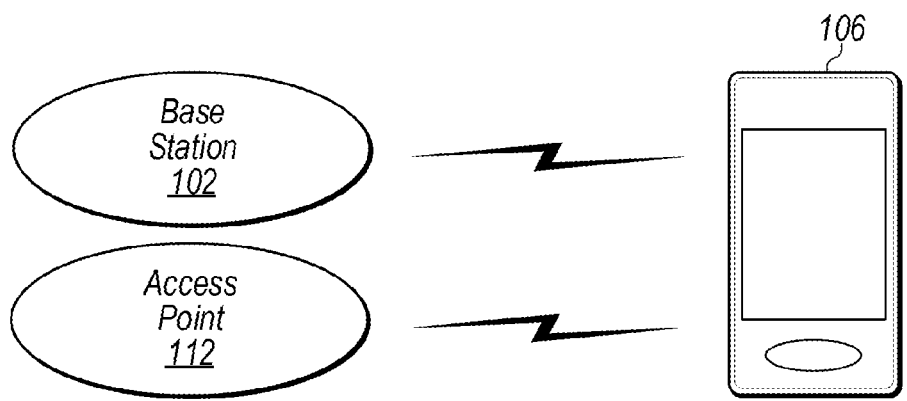
FIG. 2 illustrates an example of a base station (BS) and an access point in communication with a user equipment (UE) device according to some embodiments.

FIGS. 1 and 2—Example Communication System

FIG. 1 illustrates a simplified example wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, cHRPD), Wi-Fi, etc.

The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. In particular, the cellular base station 102A may provide UEs 106 with various telecommunication capabilities, such as voice, SMS and/or data services.

As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD, etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment (UE) 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device as defined above.

The UE 106 may include a processor (processing element) that is configured to execute program instructions stored in memory. The UE 106 may perform any of the embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
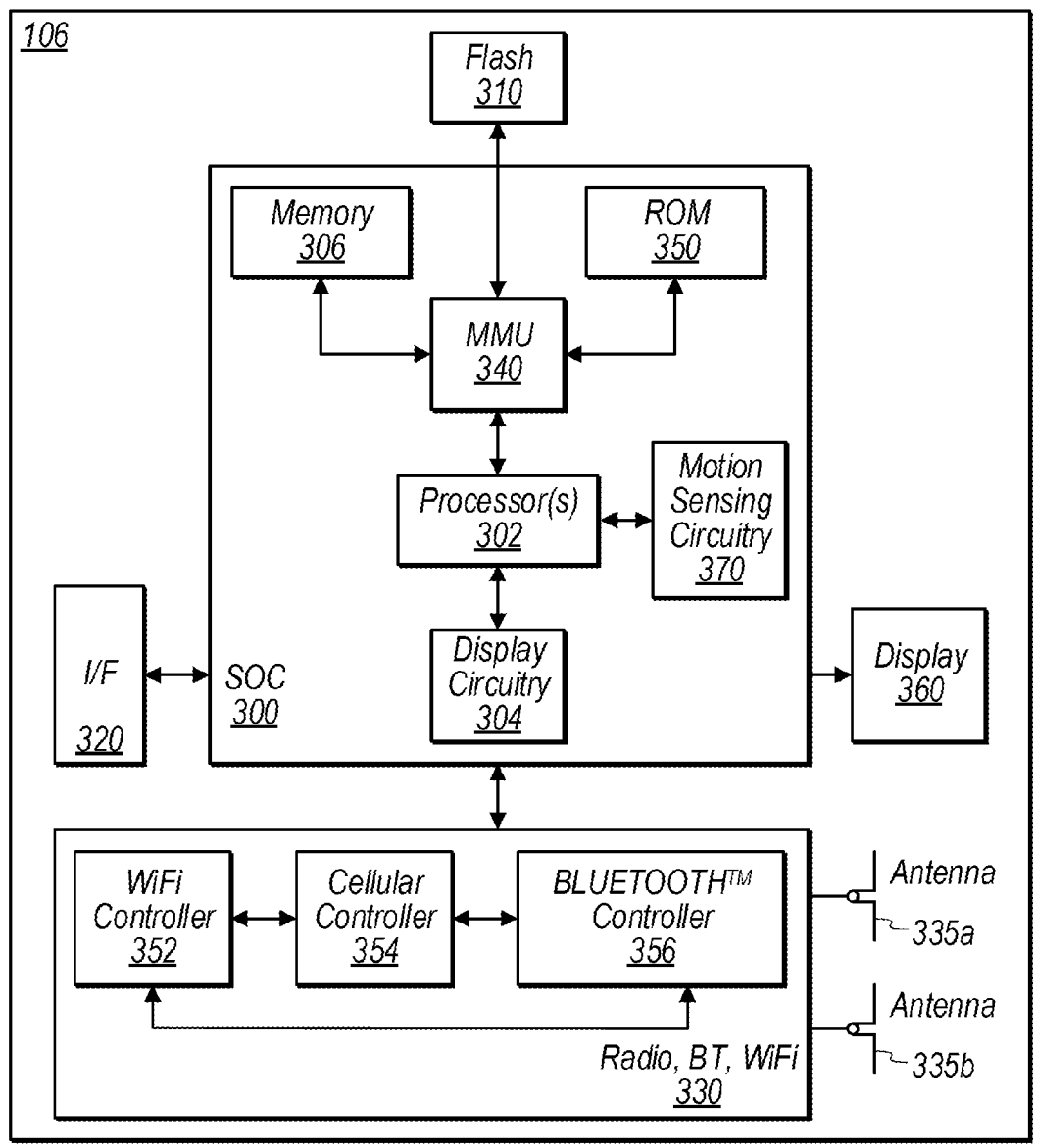
FIG. 3 illustrates an example block diagram of a UE, according to one embodiment.

FIG. 3—Block Diagram of an Example UE Device

FIG. 3 illustrates a block diagram of an example UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform concurrent generation of multiple codebooks for CSI reporting such as described further subsequently herein. The processor(s) 302 of the UE device 106 may be configured to implement part or all of the methods or operations described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Figure 4:
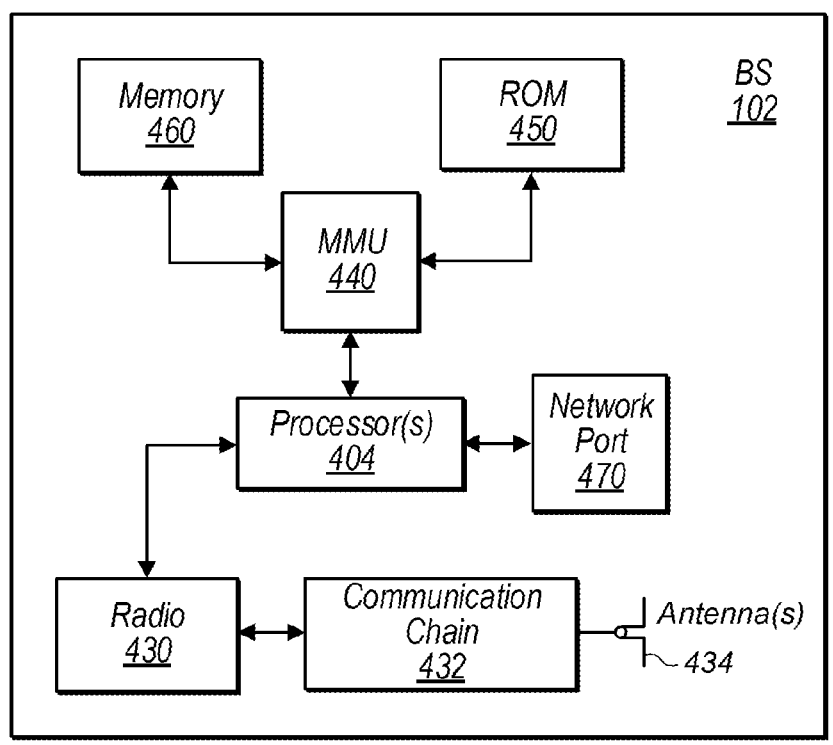
FIG. 4 illustrates an example block diagram of a base station, according to one embodiment.

FIG. 4—Block Diagram of an Example Base Station

FIG. 4 illustrates a block diagram of an example base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Multi-Access Edge Computing

Modern cellular phones are being asked to perform increasingly complex applications. In general, users prefer the use of smartphones (UEs) due to their portability, size and ease of use. However, being portable or mobile devices, UEs such as smartphones are battery-powered and have a small size relative to non-portable devices such as desktop computers. Thus, UE devices have various hardware limitations, such as battery life, power, processing ability and memory capacity. In order to reduce the load of applications running on UE devices, and also to provide for more efficient use of UE resources, efforts have been made to offload the computational requirements of the UE to another computing resource. As mentioned above, the term "Mobile Cloud Computing" (MCC) refers to the use of cloud servers to perform computational tasks that may otherwise be performed by a UE. However, as described above, the use of cloud servers that are physically remotely located from the UEs they are attempting to assist (the UEs from which they are attempting to offload tasks) may introduce communication delays that make such cloud servers unsuitable for real time applications.

Multi-access Edge Computing (MEC) provides an information technology (IT) service environment and cloud computing capability at the edge of the mobile network, within the Radio Access Network (RAN) and in close physical proximity to mobile subscribers. In other words, MEC operates to locate mobile cloud computing (MCC) services physically closer to mobile users, or physically closer to the cellular base stations that serve the UEs (closer to the "edge" of the network), to reduce communication delays. Specific user requests may thus be managed directly at the network edge, instead of forwarding all traffic to remote Internet services that are a further distance away. MEC promises significant reduction in latency and mobile energy consumption while delivering highly reliable and sophisticated services.

In a MEC system as described herein, a processing task from a UE may be offloaded to a nearby MEC host via the cellular network. The MEC host may perform the data gathering, processing and broadcasting of computational intensive tasks, and as such can cover a broad spectrum of use cases and applications. The MEC host may then return the resultant data from the processing task back to the application running on the UE.

Two key MEC operational phases may be referred to as the control phase (control plane) and the operation phase (data plane). The control phase (control plane) may include the auxiliary procedures for initiation, connection, maintenance and termination of MEC operation. The control plane decides what, when, where, and how to offload tasks correctly to the MEC servers. The operation phase (data plane) handles the routing of data to/from the edge cloud.

The control phase poses significant challenges in the design of MEC based systems, since it requires reliable signalling between users, networks and the MEC host. Due to the dynamic nature of cellular networks, the signaling may leverage and integrate aspects from both wireless communication and mobile computing together.

As noted above, the UE has limited computation capability and may suffer additional incurred latency during task offloading. As a result, as described herein the UE may utilize efficient resource allocation for local computation and careful dynamic selection of tasks to be offloaded via wireless transmission if the executed applications are latency-sensitive or mission-critical.

Embodiments described herein provide a service discovery and offloading framework for MEC based cellular (e.g., 3GPP) systems. The service discovery and offloading framework may also consider wireless channel characteristics and UE capabilities along with processing task requirements. Embodiments are described herein in the context of cellular systems (e.g., 3GPP-based systems). However, the embodiments described herein may be readily extended to non-cellular (non-3GPP-based) systems.

A current proposed standard (3GPP TS 23.758) identifies the key issues and corresponding application architecture for edge computing and discusses some potential high-level architectural frameworks. However, specific details and implementation feasibility are not yet clear. 3GPP defines User Route Selection Policies (URSP) in 3GPP TS 23.503 which are given by the network or are pre-configured in the UE. However, the URSP procedure lacks flexibility. Furthermore, these policies do not consider any UE-relevant factors, such as computational capabilities, energy levels or wireless channel characteristics (interference, channel fading, Doppler, etc.). These UE-relevant factors can have a significant impact on successful offloading and system reliability. Also, the assumption of static pre-set MEC offloading limits the capabilities of the system.

An investigation regarding latency sensitivity for Internet based gaming applications has shown that latency sensitivity is important for players. Accordingly, latency sensitivity is important for service providers who desire to best position their servers and services in the future.

Figure 13:
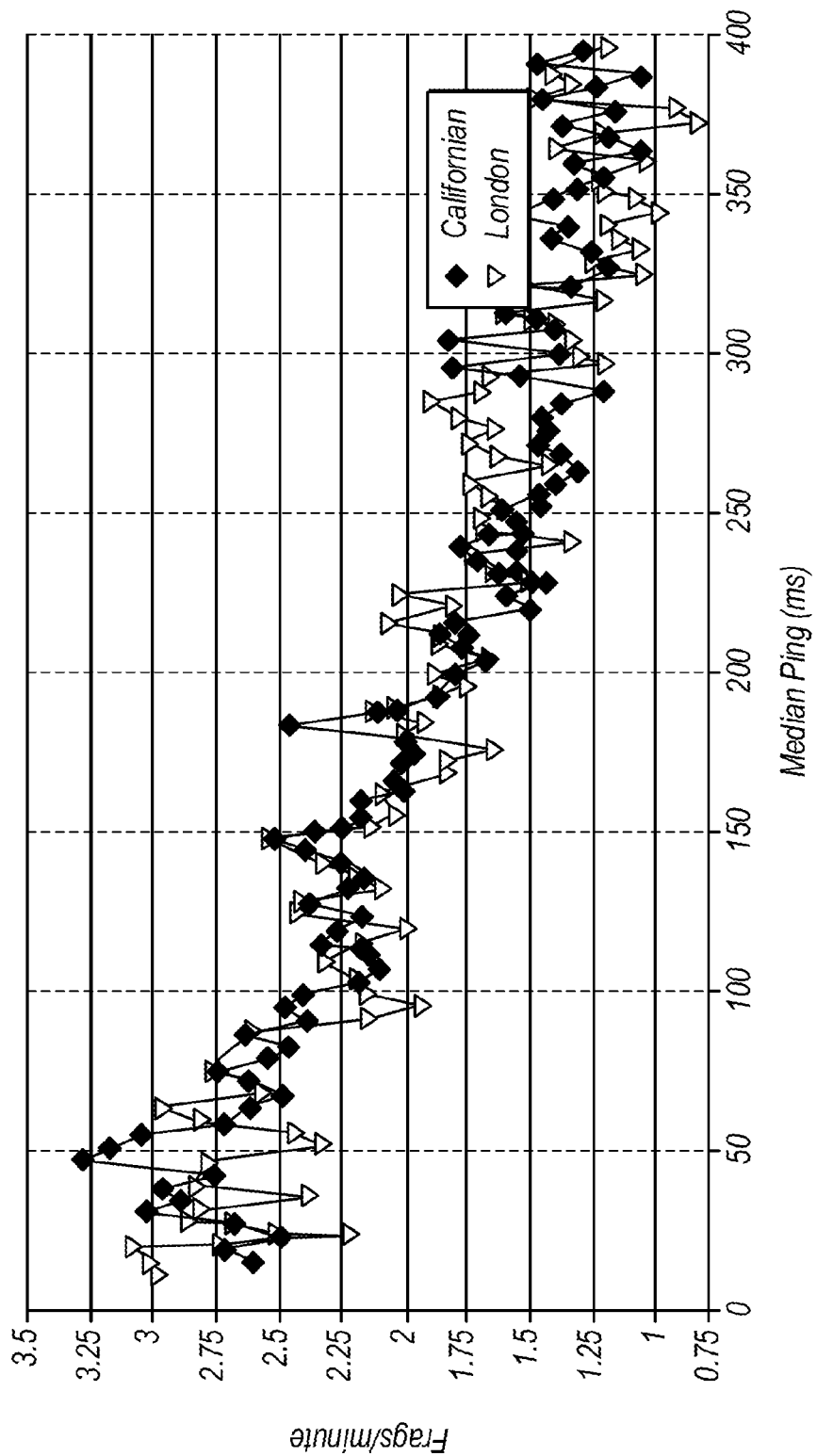
FIG. 13 is a graph of frag (kill) rate vs. median ping in a first-person shooter game.

FIG. 13 is a graph which illustrates the number of frags (kills) per minute as a function of the median ping time. Here the term "frag" refers to a "kill" in an online game, such as a first-person shooter game. The term "ping time" refers to the round-trip time for a signal or packet to reach a host computer and for the response from the host to return to the sender. FIG. 13 shows that players with 45 milliseconds median ping were averaging 1 frag (kill) per minute more than a player with 200 millisecond median ping. Given games running tens of minutes, this represents a significant impact on a game experience. See, for example, G. Armitage, "An experimental estimation of latency sensitivity in multiplayer Quake 3", The 11th IEEE International Conference on Networks, 2003. ICON2003.

A comparative experimental investigation of computation offloading to MCC and cloudlets has been performed by Hu et. al [W. Hu et. al, "Quantifying the Impact of Edge Computing on Mobile Applications", ACM APSys'16]. The authors have measured the latency for LTE and Wi-Fi offloading scenarios with face recognition and augmented reality applications. The results indicate that offloading to the network edge can bring substantial gains in terms of latency and energy consumption.

Embodiments described herein may utilize one or both of service discovery and dynamic offloading functions to improve performance of the cellular system. As described herein, dynamic offloading may take the form of channel quality dependent offloading and/or location dependent offloading, etc., and may provider greater improvements than statically determined offloading. As used herein, the term "dynamic" in terms of service discovery or offloading refers to the notion that these activities are performed while the UE is executing. In particular, the phrase "dynamic offloading" may specify that offloading decisions are evaluated and made while the UE is operating, and possibly while the application whose tasks are desired to be offloaded is executing.

Embodiments described herein may include a Service Discovery Unit for Mobile Edge Computing (MEC). The Service Discovery Unit may collect information about available MEC servers, Edge Data Networks (EDNs), and their capabilities through communication with 5G core network and exchange of Site Capability parameters.

Embodiments described herein may also include an Offloading Controller, which may be characterized as a logic unit that supports processing task offloading. The Offloading Controller may take into consideration the channel conditions, cellular network system parameters, and application requirements, as well as other information. The Controller may compute a value for a pre-defined utility function and compared this computed value to an application specific threshold. The Controller may then decide whether the task will be offloaded to the MEC server, executed locally, or completely dropped (not performed). In some embodiments, the Offloading Controller contains the Service Discovery Unit, and hence performs both service discovery and offloading.

The embodiments described herein may become standardized, i.e., may become part of cellular specifications followed by most or all in the cellular industry. Alternatively, the embodiments described herein may be used as a proprietary solution by a single manufacturer, such as a UE manufactured by company A communicating directly with a MEC server that may also be owned or operated by company A. Thus the embodiments described herein, such as the Service Discovery Unit and/or Offloading Controller, do not require standardization.

Figure 5:
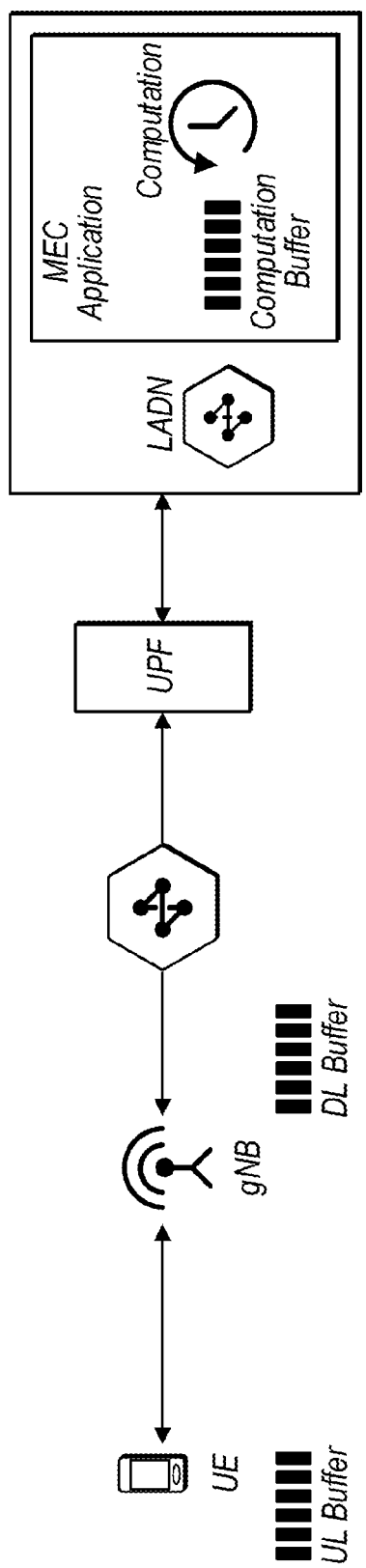
FIG. 5 illustrates an example cellular network system including mobile edge computing, according to the prior art.

FIG. 5—MEC Operation in 5G

FIG. 5 is a block diagram illustrating typical Mobile Edge Computing (MEC) in a current 5G network. As shown, the UE communicates in a wireless fashion with a base station, referred to as gNB. The base station in turn communicates to a cellular network, and in particular to a user plane function (UPF). The UPF in turn connects to a Local Area Data Network (LADN). During the operation phase, traffic from the respective UEs is routed from the base station (gNB) towards the UPF (User Plane Function). The UPF is located close to and/or within the Local Area Data Network (LADN). The LADN hosts MEC servers and applications, and computational tasks are performed by these MEC servers and applications within the LADN.

Figure 6:
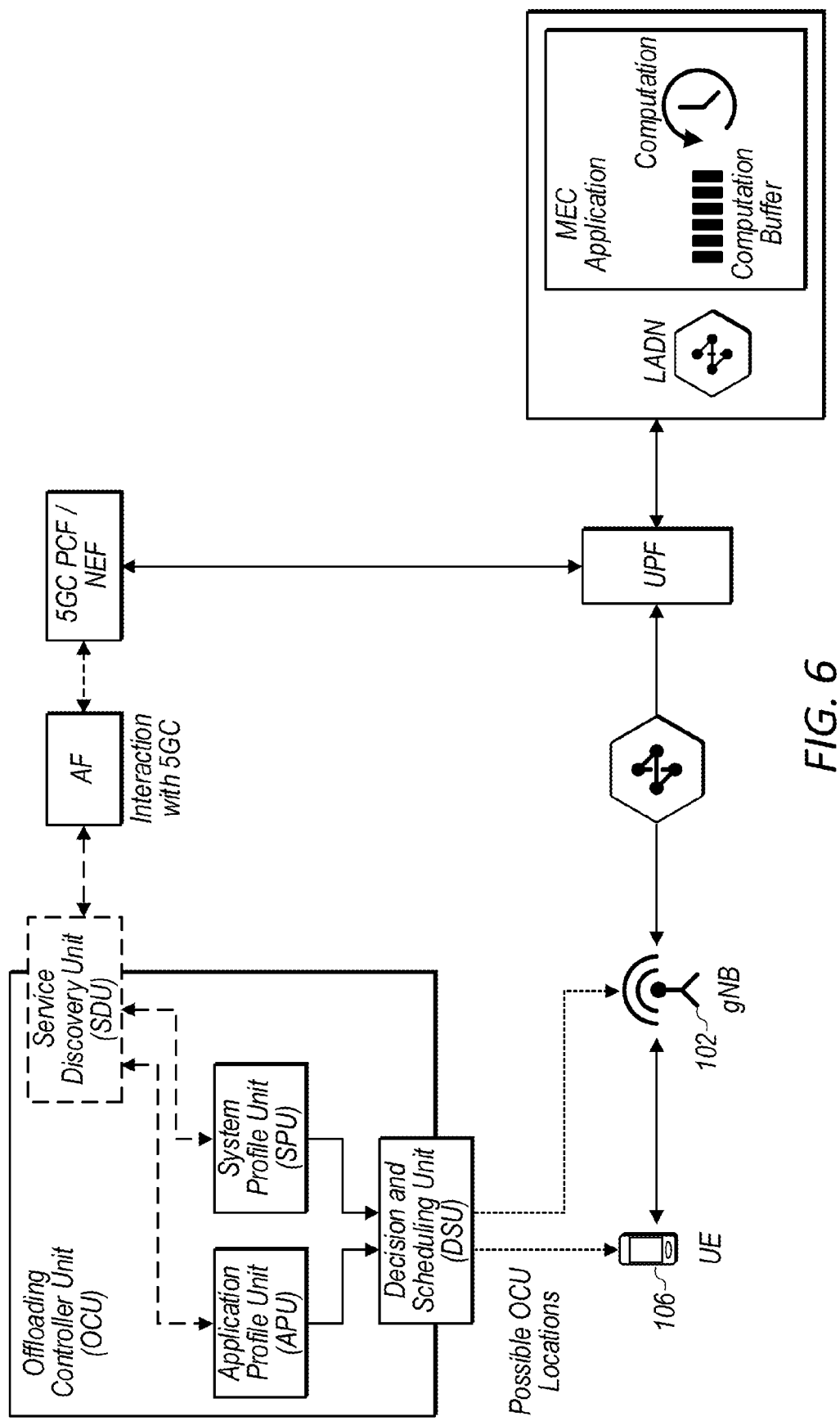
FIG. 6 is a block diagram of a cellular network system including mobile edge computing and an offloading controller unit, according to some embodiments.

FIG. 6—MEC with an Offloading Controller

FIG. 6 is a block diagram of a portion of a cellular network implementing Multi-access Edge Computing (MEC) according to embodiments described herein. As shown in FIG. 6, the UE communicates in a wireless fashion with a cellular base station, referred to as gNB. The base station in turn communicates to a cellular network, and in particular to a user plane function (UPF) of the core network. The UPF in turn connects to a Local Area Data Network (LADN). The LADN hosts MEC servers and applications, and computational tasks that would otherwise be performed by the UE may be offloaded to, or performed by, these MEC servers and applications within the LADN.

FIG. 6 is somewhat similar to the block diagram of FIG. 5, but includes the very important addition of an Offloading Controller Unit (OCU). More specifically, embodiments described herein may operate to provide improved multi-access edge computing (MEC) operations by utilizing an offloading decision logic unit, referred to herein as an Offloading Controller Unit (OCU). The OCU may operate to facilitate and manage the dynamic offloading of tasks in MEC based systems. More specifically, with the presence of the OCU, tasks that normally would be required to be executed by the UE can be more intelligently offloaded to computer servers that are part of the MEC infrastructure.

In some embodiments, the Offloading Controller Unit (OCU) may be composed of four parts: the Application Profile Unit (APU), the System Profile Unit (SPU), the Service Discovery Unit (SDU), and the Decision and Scheduling Unit (DSU), as shown.

The Offloading Controller Unit can be located within (implemented within) the UE or may be implemented in another device, such as a base station (gNB), or at a service provider (SP) site. In some embodiments, portions of the Offloading Controller Unit may be distributed across multiple devices. For example, in some embodiments the Service Discovery Unit may be implemented in a network element in the core network, or a server outside of the core network, while some or all of the APU, SPU and DSU may be implemented in the UE (and/or the base station). Various other implementation configurations are also contemplated.

In an embodiment where the Offloading Controller is implemented in a base station, the OCU may operate to serve a plurality of UEs present within a geographic area. In addition, in an embodiment where the Offloading Controller is implemented in a base station, the UE may provide application requirements to the base station via dedicated signaling. The user of the UE may control exposure of UE application data to the base station.

As shown, the Service Discovery Unit may communicate to an Application Function (AF) which in turn communicates to the core network, e.g., the 5G core network (5GC). The core network may include a Policy Control Function (PCF) and a Network Exposure Function (NEF). The core network block in turn may communicate with the UPF. The Service Discovery Unit (SDU) may operate to obtain information about available MEC servers, Edge Data Networks (EDNs), and their capabilities. The SDU may also establish basic connectivity with EDNs. The Service Discovery Unit may provide information on available edge computing resources to the Application Profile Unit and the System Profile Unit.

The Application Profile Unit (APU) may operate to analyze application parameters and requirements and communicate them to the DSU.

The System Profile Unit (SPU) may operate to analyze system parameters, including network, RAN, UE, and MEC capabilities.

The Decision and Scheduling Unit (DSU) may operate to analyze information from the APU and SPU and make decisions re the offloading to be performed. The DSU may then schedule or assign task(s) to the associated MEC server.

The OCU may be implemented in any of various ways. More specifically, the functionality of the OCU may be implemented or partitioned in any of various types of logical units, as desired. Further, as noted above, portions or units of the OCU may be distributed among two or more different devices.

Figure 7:
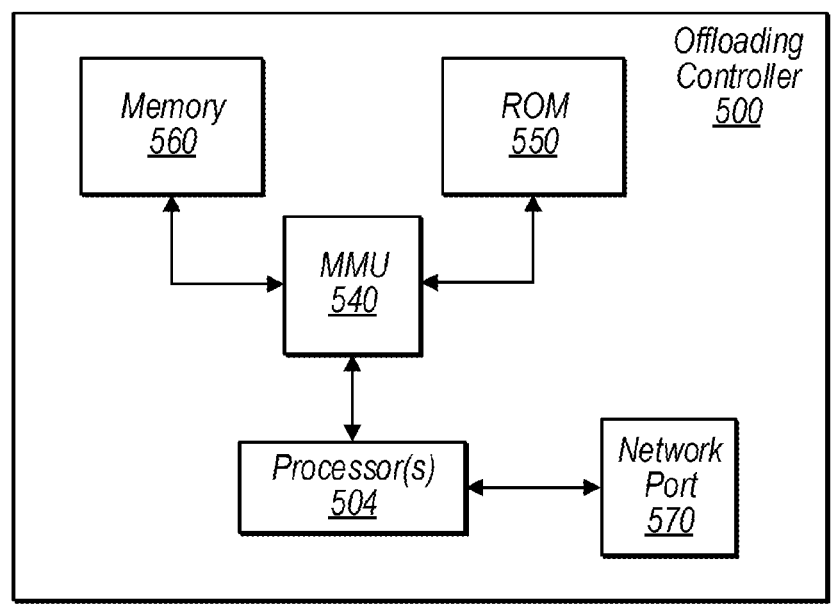
FIG. 7 illustrates an example block diagram of a server (or network element), according to some embodiments.

FIG. 7—Example Block Diagram of a Network Element

FIG. 7 illustrates an example block diagram of a network element 500, according to some embodiments. According to some embodiments, the network element 500 may implement one or more logical functions/entities of a cellular core network, such as a mobility management entity (MME), serving gateway (S-GW), access and management function (AMF), session management function (SMF), Edge Discovery Service (EDS), etc. It is noted that the network element 500 of FIG. 5 is merely one example of a possible network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more base stations and/or other cellular network entities and/or devices. The network element 500 may communicate with base stations (e.g., eNBs/gNBs) and/or other network entities/devices by means of any of various communication protocols and/or interfaces.

As described further subsequently herein, the network element 500 may include hardware and software components for implementing and/or supporting implementation of features described herein. The processor(s) 504 of the core network element 500 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. For example, the network element 500 may implement the Service Discovery Unit described herein.

The block diagram of FIG. 7 may also be representative of a server computer (possibly located outside of the cellular network) that may implement a portion or all of the operations described herein, such as the SDU.

Figure 8:
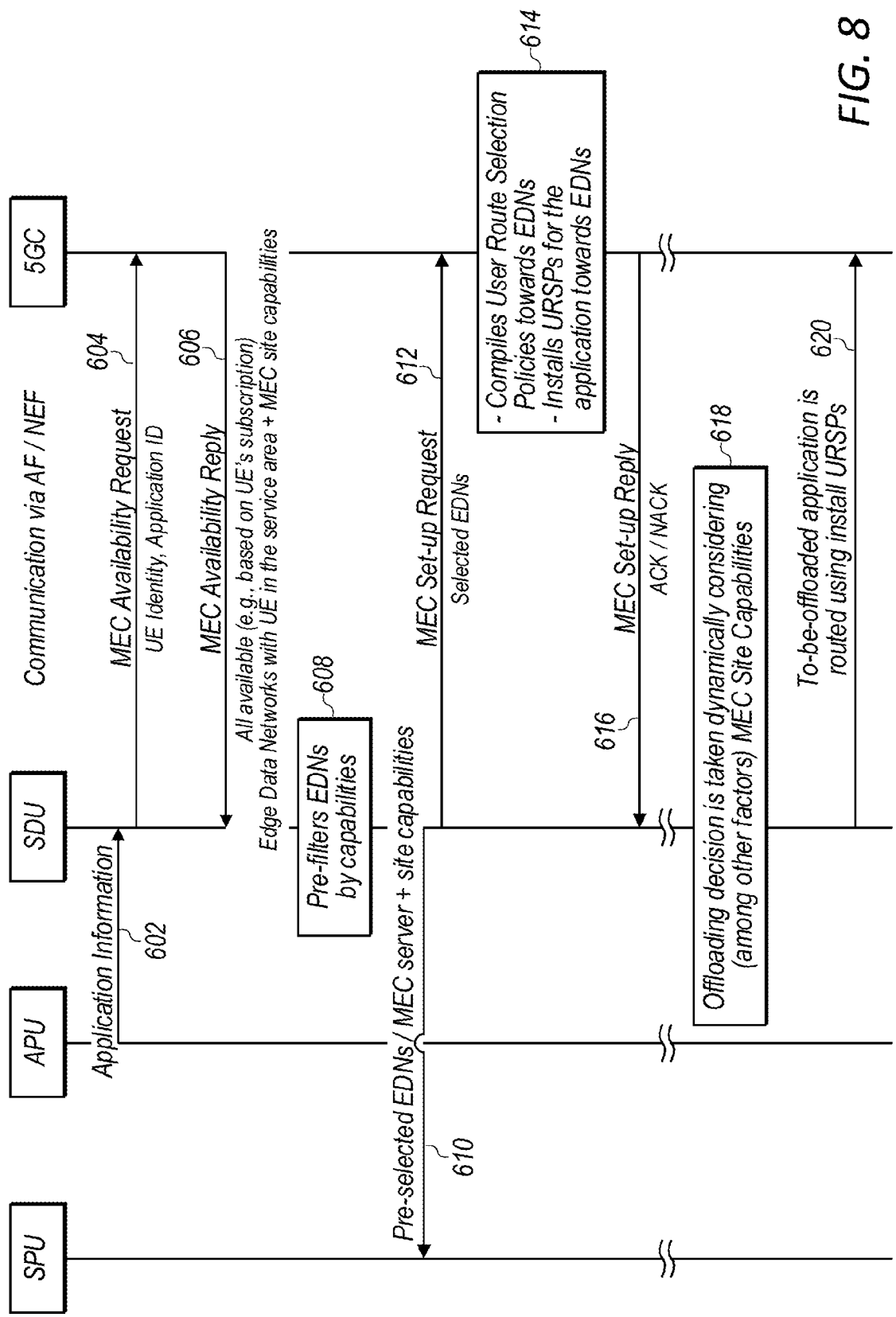
FIG. 8 is a flow diagram illustrating service discovery, according to some embodiments.

FIG. 8—Service Discovery

The OCU may implement a Service Discovery function to enable UEs to locate MEC application servers that can satisfy the UE's application requirements. The deployment of Edge Data Networks (EDN's) may not be available at all locations due to cost and/or operational constraints. Therefore, it is important for a user equipment (UE) to be able to find an MEC Application Server that can satisfy the required application requirement key performance indicators (KPIs). Therefore, it is desirable for the OCU to provide a service discovery framework (referred to herein as a Service Discovery Unit) to enable UEs to discover and associate with the most suitable MEC Application Server available.

In some embodiments, service discovery may be a prerequisite for dynamic offloading and can occur offline (non-dynamically), prior to dynamic offloading. Service discovery can be repeated whenever necessary, e.g., periodically or based on subscription to events (e.g., in case of UE or application mobility). In some embodiments, service discovery can be implemented in systems supporting static offloading only. In some embodiments, service discovery can be performed dynamically during application execution.

As discussed above, SDU functionality may be located at the UE, at the site of the service provider (SP) (e.g., in a computer maintained by the service provider), or in the cellular network itself (e.g., in a network element). SDU functionality can be also located at an MEC server. As noted above, FIG. 7 shows an example block diagram of a computer system that may be representative of either a service provider computer, a network element or an MEC server.

FIG. 8 is a flow diagram (or timing diagram) illustrating operation of the service discovery function performed by the OCU, according to some embodiments. The service discovery process may operate as described below.

First, at 602 the SDU may receive application information from the APU. The application information may comprise an application id that identifies the type of application, or the specific application, executing on a respective UE. The application information may also comprise MEC requirements associated with the application, e.g., requirements of the MEC server in order for the server to satisfy the application's needs. It is noted that the application information may be obtained by the APU from the application itself or a database of application information.

At 604, in response to receiving the application information from the APU, the SDU may communicate an MEC Availability Request to the core network (e.g., 5GC) via an Application Function (AF) or NEF. The purpose of the MEC Availability Request may be to obtain information about available Edge Data Networks (EDNs) and MEC servers along with their MEC site capabilities.

At 606 the core network may provide an MEC Availability Reply to the SDU. The MEC Availability Reply may contain information regarding availability of MEC servers, such as location, available computational resources, etc. For example, the MEC Availability Reply may contain information regarding some or all of the MEC servers or Edge Data Networks within the service area of the UE. The MEC Availability Reply may also comprise additional or auxiliary information, referred to as MEC site capability information. The MEC Availability Reply may also contain other non-technical parameters, such as "cost of offloading", or other parameters. The determination of which MEC servers are available may be based on various criteria, such as the UE's subscription to this type of service.

In some embodiments, MEC site capability information may be potentially helpful for the decision of dynamic MEC selection. The MEC site capability information may contain various parameters characterizing the capability of the MEC servers, such as information about the MEC server's computation capabilities, latency between the UE and the server, and other parameters desirable in making an offloading decision. Capabilities can be communicated in a form of statistical guarantees, average guarantees, or other forms.

The core network may access various UE information in order for it to obtain and provide MEC site capability information. For example, the core network may access UE information such as UE identity, UE location, tracking area id, etc. This UE information can be obtained by the AF/NEF from other network core functions.

Upon receipt of the MEC Availability Reply from the core network in 606, at 608 the SDU may filter the Edge Data Networks based on their capabilities. For example, certain Edge Data Networks that are computationally inadequate or overburdened, or which may too high of a latency, may be removed from consideration.

At 610 the SDU may pre-select EDNs and MEC servers based on their capabilities/costs and based on application requirements, and the SDU may communicate available EDNs/MEC and their capabilities to the SPU.

At 612 the SDU may communicate an MEC Set-up Request to the core network. The MEC Set-up Request may be provided to the core network to trigger basic connection establishment with selected EDNs, e.g., establishment of URSPs, PDU sessions, or network slices. In some embodiments, the MEC Set-up Request may trigger a connection establishment with pre-selected EDNs, if necessary At 614, in response to the MEC Set-up Request, the core network may compile user route selection policies toward EDNS. The core network may also install USRPs for the applications towards EDNs.

At 616 the core network may transmit an MEC Set-up Reply to the SDU. The MEC Set-up Reply may contain an Acknowledge or Negative Acknowledge (ACK/NACK). The MEC Set-up Reply may also contain various route information useable in enabling communication with the EDN.

The Service Discovery procedure (e.g., operations 602-616) may be performed offline, e.g., prior to application execution on the UE. These operations may be periodically performed as needed, or might be performed based on certain events (event-based) to ensure that the UE has up-to-date information on available edge networks Examples of events which may cause the Service Discovery procedure to be performed (or repeated) are notification of a change of MEC site capabilities, such as MEC load, UE power up, when the UE enters a new service area or cell, a change in UE mobility status, or other factors.

Alternatively, the operations of 602-616 may be performed more dynamically, such as when an application is launched (selected for execution) on the UE that may require offloading services, or which has previously subscribed to offloading services.

At a (possibly) later time an application may be executing on the UE that desires, or has subscribed to, offloading services. At 618 the SDU may dynamically make an offloading decision based on various information, such as information in the MEC Availability Reply and/or information in the MEC Set-up Reply. For example, the SDU may dynamically make an offloading decision based at least in part on the MEC Site Capability information, among other factors. At 620 the application to be off-loaded may be routed to one or more MEC serves using installed URSPs. Task offloading is described in greater detail below.

Dynamic Task Offloading

The following provides more information on the components of the OCU which perform dynamic task offloading. As described above, the OCU may be composed of the Application Profile Unit, the System Profile Unit, and the Decision and Scheduling Unit. The operation of the fourth component, the Service Discovery Unit, was described above with respect to FIG. 8.

The Application Profile Unit may store processing information on application task(s) that are candidates to be offloaded. The APU may also store information on application task partitioning and computational costs of each task. The cost of a task can be either fully known, e.g., provided by the application developer, or obtained from profiling at runtime. If the exact cost is not known, an estimate of the cost (e.g., coarse quantization of the cost) may be sufficient, e.g., low, medium or high computational load. This can be pre-configured in advance or estimated during runtime. The computation cost of a task can be based on average cost or worst-case cost or any other value related to the statistical distribution of the computational cost. The APU may store this information during runtime utilizing performance profiling services of common operating system and application processors. In some embodiments, the Application Profile Unit can be implemented as a software component executing on a computer (such as the UE).

The System Profile Unit may operate to process various information, such as system information, radio channel characteristics, and power levels at the UE required to execute the offloading task. The SPU may obtain this information during runtime utilizing energy monitoring and cellular radio link state information provided by common operating systems, application processors and the respective energy management and cellular modem driver components. In some embodiments, the System Profile Unit can be implemented as a software component executing on a computer (such as the UE).

The Decision and Scheduling Unit may operate to collect the data from Application Profile Unit and System Profile Unit and determine if a task is to be offloaded to an MEC server or executed locally. The Decision and Scheduling unit may decide whether or not to offload a task dependent on a threshold θ defined for the specific task(s). The threshold θ may be application dependent and can either be derived runtime based on radio conditions, data rate requirements, and computing requirements, or defined in a static fashion at design time.

In some embodiments, for each application a utility function U(l, e) may be defined. The utility function may represent the relative utility (or relative benefit) of offloading a task vs. local execution. The utility function may be a generic performance measure, potentially incorporating application aspects (e.g., quality of experience, offloading cost) and system aspects (e.g., energy consumption). The utility function may describe how performance depends on the latency l, energy e, and offloading cost c during task execution interval t. The Decision and Scheduling unit may apply the utility function to the local compute and offloading compute options to make the offloading decision. Thus the utility function may be used to regulate the offloading decision. In some embodiments the utility function may be used to compute a value that is compared to a specific threshold θ s described above. One example of the form of the utility function is as follows:

$$\sum_{t=t_0}^{T} U_t(l_{offload}, e_{offload}) - U_t(l_{local}, e_{local}) + U_c > \theta.$$

where [$t_0$, T] specifies the horizon of interest.

If the calculated difference is lower than the pre-defined threshold, the task(s) will be executed locally. If the calculated difference is higher than the pre-defined threshold, the task(s) will be executed remotely. The utility function and threshold may be defined so that acceptable tolerances (upper and lower values) in delay, energy and cost are included in the decision. In some embodiments, different threshold values, i.e. hysteresis, are applied for the decision to offload a local task and the decision to move back an offloaded task to the local UE. This may operate to prevent task execution from "ping-ponging" back and forth between local and offloaded execution.

Finally, the Decision and Scheduling Unit may schedule the tasks to be offloaded and sends the request to the network to start the process of offloading. The request may also include a message that broadcasts basic task parameters to the network and MEC servers. An example of parameters to be included in the message is shown in FIG. 9. As shown, the basic task parameters may include Task Priority, Latency Requirements, Periodicity, and Computational Complexity, among possible others. The MEC servers may use the received values of these parameters in performing the offloaded task.

In some instances, the Decision and Scheduling unit may determine that the task(s) cannot be executed at any of those locations due to, e.g., insufficient power levels at the UE or bad channel conditions with 5G networks. In this case the task may be dropped, i.e., may simply not be executed. When this occurs, one or both of the network and the MEC server may maintain an offloading mode index I(t)$_m$ at the time t, m={u, s, d} where u, s, d are flags designating execution on UE, server or dropped, respectively. In some embodiments, the offloading mode index for a future timeframe can be used by the network as well as the MEC server to plan the allocation of networking and compute resources among all users. In other embodiments, the d flag can be used by the host for error handling or concealment.

In some embodiments, the decision of whether or not to offload can remain being performed locally on the UE. In this case, the implementation of an offloading controller is purely proprietary and does not require any changes in standardization of cellular networks or MEC systems.

In some embodiments, the Decision and Scheduling Unit can be implemented as a software component executing on a computer, such as the UE or an applications processor.

Figure 10:
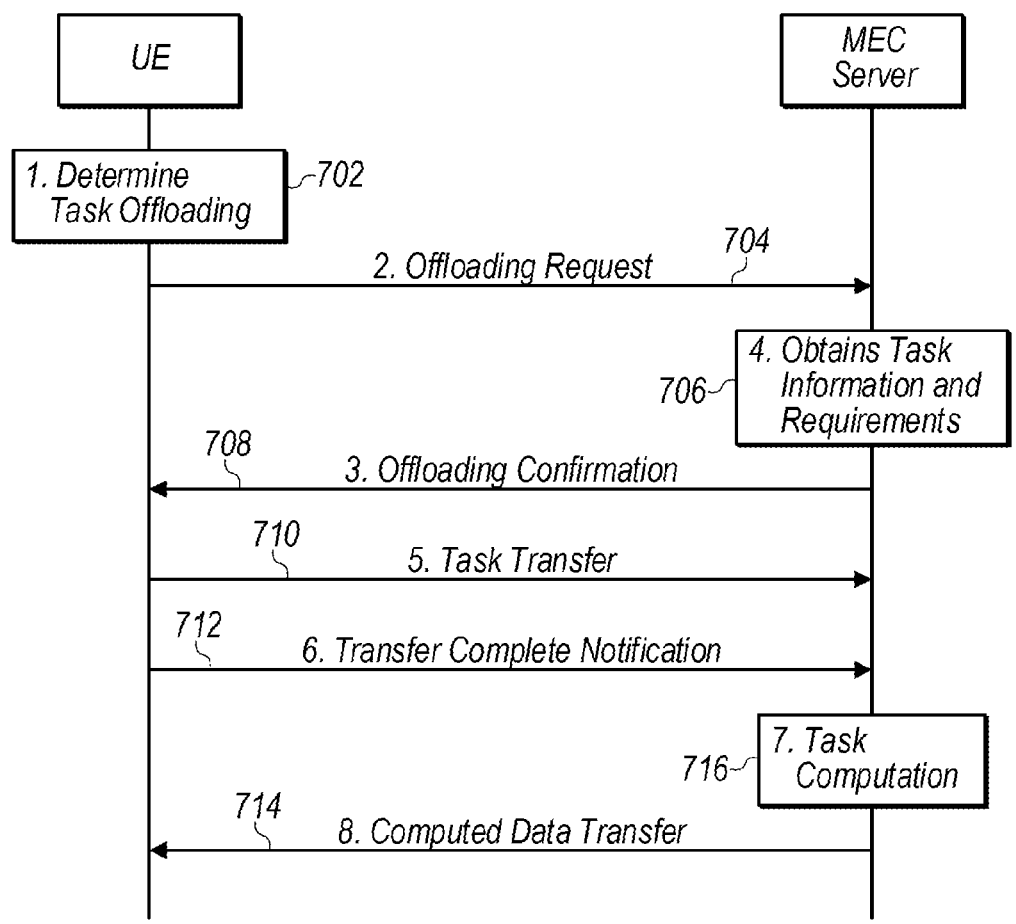
FIG. 10 is a flow diagram illustrating operation of the Decision and Scheduling Unit in the Offloading Controller Unit, according to some embodiments.

FIG. 10 illustrates one embodiment of task offloading signaling flow where the OCU is implemented in the UE. The flow in FIG. 10 assumes that the MEC Server and routes through the network are already established, e.g. by means of a preceding service discovery process.

As shown, at 702 the UE determines if task offloading should be performed. In some embodiments the UE may make this determination dynamically during application execution. At 702 the task offloading decision may be performed by the Decision and Scheduling Unit as described above. For example, the UE may be executing a time critical application, or an application that requires real-time performance, such as an interactive game, and may determine that one or more of the tasks required in the application should be offloaded to help guarantee real-time performance. The UE may make this determination in any of various ways. For example, the UE may take into account one or more of its battery level, current computational requirements, and processing latency in making this determination. In some embodiments, as described above the UE may use a utility function and threshold as described above in making this determination. The utility function may be the same for each application, or may be specific to the particular application being executed. Similarly, the threshold may be generic or may be specific to the application. One or both of the utility function or the threshold may be dynamically adjusted during application execution to reflect current conditions.

At 704 the UE provides an Offloading Request to an MEC server. After successful MEC server discovery and connection establishment between the UE and server, the UE may initiate an offloading procedure. This may involve the UE sending an Offloading Request, which may be a message containing key information on the application and its requirements. For example, the information may be information on application type (e.g. V2X, game, health), application requirements (e.g. end to end latency requirements, bandwidth, memory), application priority (e.g. high, medium, low), etc. The Offloading Request may comprise various other information as well. Thus at 704 the UE transmits signaling to the base station that is intended for the MEC server and which requests computational resources for offloading.

In response to receiving the Offloading Request in 704, at 706 the MEC server may obtain task information and requirements from the Offloading Request.

At 708 the MEC server may transmit an Offloading Confirmation back to the UE. This Offloading Confirmation message may indicate that the MEC server has accepted the offloading request and will perform the task that the UE desires to offload.

At 710 the UE may transmit one or multiple application tasks to the MEC server. Depending on privacy requirements, the UE may transmit the complete application to the MEC server as well. A task identifier might be attached to each task. Thus once the UE receives the Offloading Confirmation in 708, the UE may send data to be offloaded to the MEC server.

When the task transfer is complete, at 712 the UE may transmit a Transfer Completion Notification to the MEC server indicating that the task transfer to the MEC server has been completed.

At 714 the MEC server may perform the task that has been offloaded to it. More specifically, the MEC server may perform the task computations and produce various results.

At 716 the MEC server may transmit the computed results to the UE for use by the application executing on the UE.

Discovery and Offloading in a 5G Core Network

Support for edge computing in 5G networks is defined in TS 23501, Section 5.13. The 5G Core Network selects a User Plane Function (UPF) close to the UE and executes traffic steering from the UPF to the local Data Network via a N6 interface. This may be based on the UE's subscription data, UE location, the information from Application Function (AF), policy or other related traffic rules.

In order to enable dynamic offloading in 5G networks, the Network Exposure Function (NEF) may be enhanced with UE Discovery and Offloading Parameters used for the service discovery and dynamic offloading, as shown in the table below:

| UE Discovery and Offloading Parameters | Description |
| --- | --- |
| Computational capabilities | Indicates computational capabilities of a MEC server. Example: CPU frequency |
| Response time | Indicates the time for which the server is available. Example: 1 m to 1 hour. |
| Application priority | Indicates priority of a task execution at the MEC server. Example: low, medium, high |
| Maximum latency | Indicates maximum delay between the UE and MEC server. Example: 0.5-1 ms. |

In some embodiments, the UE discovery and offloading parameters can be a part of Network Status Reporting from NEF to AF. The report can be a one-time report or a continuous (repeated) request. In other embodiments, the UE discovery and offloading parameters can be for MEC application dedicated message exchange between AF and NEF, and may be exchanged on demand only.

IMPLEMENTATION EXAMPLE

Figure 11:
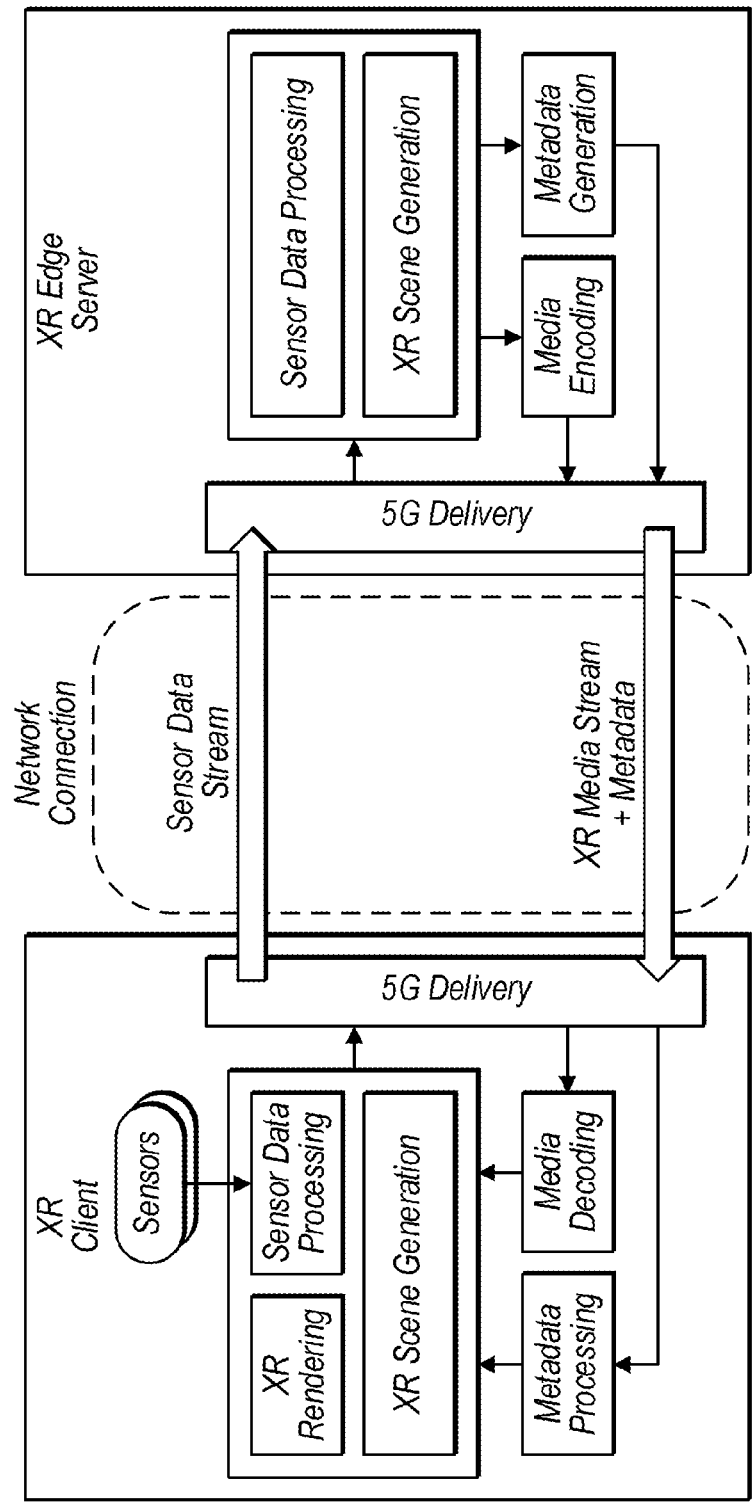
FIG. 11 is a block diagram of an extended reality (XR) distributed computing architecture, according to some embodiments.

3GPP TR 26.928 defines Extended Reality (XR) in 5G networks, i.e., this portion of the standard provides use cases, network architecture, media format analysis, etc. Chapter 5 of the standard contains information regarding different XR processing and media centric architectures, considering an XR server and an XR device communicating over a 5G network. The proposed architectures are general without any specific offloading mechanism that considers network characteristics and the XR client. For example, Section 5.2.6 defines an XR distributed computing architecture for the XR application supporting XR split rendering. The workload is split between an XR edge server and the device as shown in FIG. 11 (3GPP TR 26.928, 5.2.6-1).

As shown, an XR client connects to the network and joins XR rendering application. The XR client sends static device information (e.g., sensors, supported decoders, display configuration) to the XR edge server. Based on this information, the XR edge server sets up encoder and formats.

Figure 12:
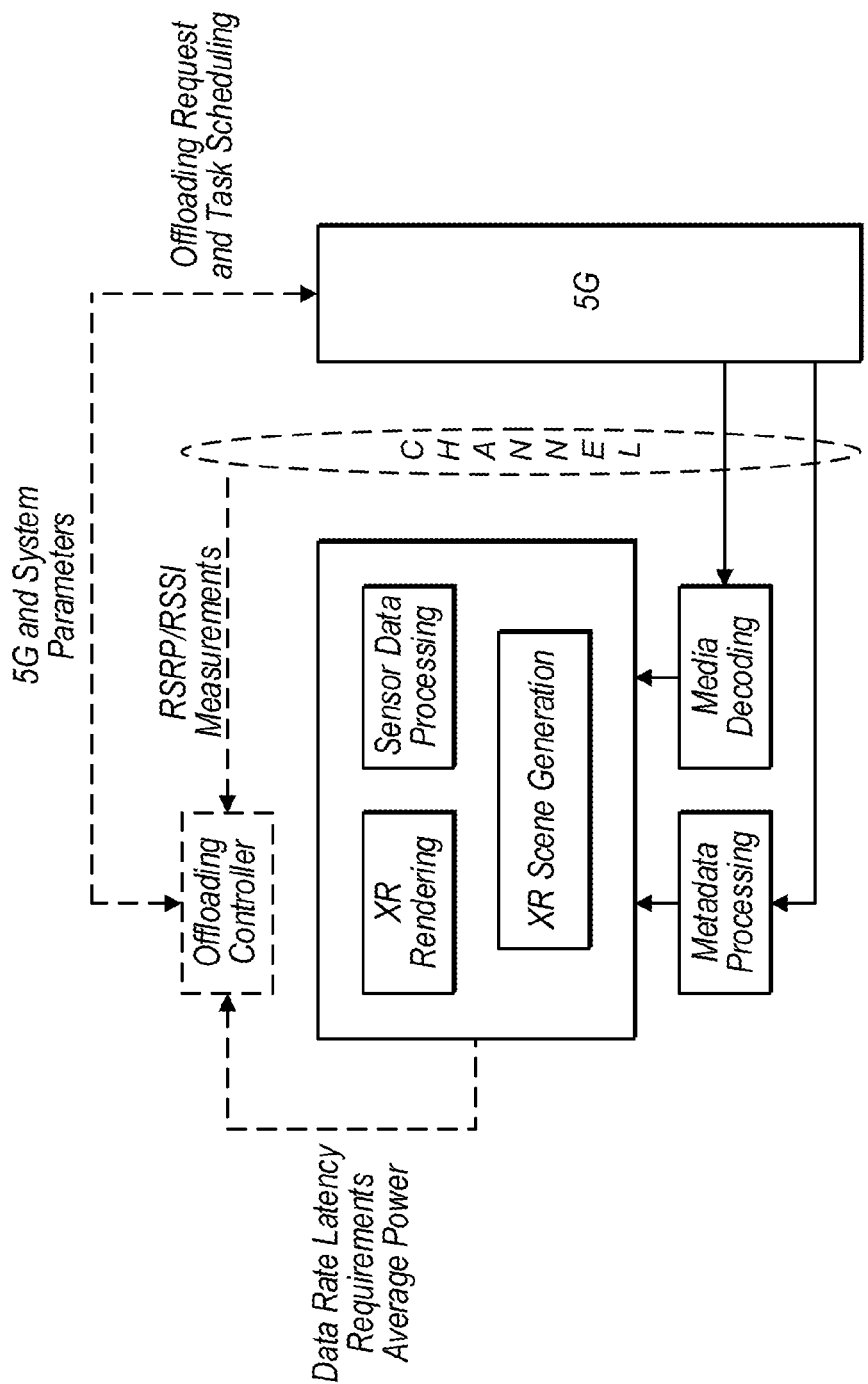
FIG. 12 is a block diagram illustrating a proposed MEC Controller implemented in an XR architecture, according to some embodiments.

FIG. 12 shows how the proposed MEC Controller can be implemented into a proposed 3GPP architecture. As shown, Offloading Controller may collect information from the Application Unit on an XR task to be executed. As shown, the Application Unit may include an XR Rendering task, a Sensor Processing task, and an XR Scene Generation task. In this particular example, XR Sensor Data Processing is a candidate for offloading. Quality of Experience can be used as the Utility function which can be pre-calculated offline.

The Application Unit may send information on one or more of data rate, latency requirements and/or average power to the Offloading Controller. The UE may also collect RSRP and RSSI measurements and network system parameters such as bandwidth, frequency, modulation, and available transmission power. The UE may perform these measurements and collection of network system parameters in the same time frame as sending information to the Offloading Controller.

The Offloading Controller may derive energy and latency metrics from these system parameters. Based on these energy and latency estimates for local and remote processing options, the Offloading Controller may compare the Utility function to a predefined threshold and make a decision on offloading.

For latency the following contributions may be considered and assessed against the latency of local processing option: 1) queuing latency at UE (waiting time to schedule task for offloading); 2) transmission latency from UE to MEC server; 3) queuing latency at the MEC server (waiting time to execute the task); and/or 4) computational latency at MEC server.

For energy, the contributions of cellular uplink and downlink transmissions may be considered and compared against the energy required for local XR Sensor Data Processing. Thus, if the energy required for cellular uplink and downlink transmissions is higher than the energy required for local XR Sensor Data Processing, then the Offloading Controller may decide to not perform any offloading. Alternatively, if the energy required for cellular uplink and downlink transmissions is lower than the energy required for local XR Sensor Data Processing by some threshold, then the Offloading Controller may decide to perform offloading. As another alternative, the Offloading Controller may take this comparative energy calculation into account with other factors in making the offloading determination.

New Information Elements

To support dynamic offloading, embodiments of the system described herein may include the following new Common Information Elements. New Information Elements (IEs) are in bold below. These new IEs are proposed to be added in 3GPP TS 23.558, Chapter 8 as shown in Tables below:

TABLE 8.2.2-1

| Application Client Profile: | | |
| --- | --- | --- |
| Information Element | Status | Description |
| Default EAS ID | M | The default EAS for the application client |
| Application Client Type | M | The category or type of Application Client (e.g. V2X) |
| ECSP Filter | O | The identity of Edge Computing Service Provider(s) that the EEC is willing to connect to. If this field is present, the ECS may filter its response based on this preference. |
| Application Client Schedule | O | The expected operation schedule of the Application Client (e.g. time windows) |
| Application Client Service Area | O | The expected location(s) (e.g. route) of the hosting UE during the Application Client's operation schedule This geographic information can express a geographic point, polygon, route, signaling map, or way point set |

TABLE 8.2.2-1-continued

Application Client Profile:

| Information Element | Status | Description |
|---|---|---|
| Application Client Service KPIs | O | KPIs required in order for Application Clients to receive services form the EAS, as described in Table 8.2.3-1 |
| Application Client Mobility | O | The expected velocity class of the UE during the Application Client's operation schedule (e.g., 'stationary', 'nomadic'/'pedestrian', 'vehicular', 'high-speed train'). |
| Priority | O | Allocation and retention priority enabling the server to perform prioritization between different requests from the same UE and between requests from different UEs. |

TABLE 8.2.3-1

Application Client Service KPI

| Information element | Status | Description |
|---|---|---|
| Connection bandwidth | O | The required connection bandwidth in Kbit/s for the application. |
| Service continuity support | O | Indicates if service continuity support is required or not for the application. |
| Maximum request rate | O | The maximum request rate to be generated by the Application Client. |
| Response time | O | Maximum response time required for the server servicing the requests. |
| Availability | O | Minimum percentage of time the server is required to be available for the Application Client. |
| Compute | O | The maximum compute resources required by the Application Client |
| Graphical Compute | O | The maximum graphical compute resources required by the Application Client |
| Memory | O | The maximum memory resources required by the Application Client |
| Storage | O | The maximum storage resources required by the Application Client |
| Application Client type-specific information | O | Information specific to each Application Client type e.g. video, VR. etc. |

NOTE:
The response time includes the round-trip delay time of the request and response packet, the processing time at the server arid the time required by the server to consume 3GPP Core Network capabilities, if any.

TABLE 8.2.5-1

Edge Application Server Service KPIs

| Information element | Status | Description |
|---|---|---|
| Maximum Request rate | O | Maximum request rate from Application Clients supported. |
| Estimated Maximum Response time with percentile | O | The estimated maximum response time advertised for Application Clients' service requests. (NOTE 1, NOTE 2) |
| Availability | O | Advertised percentage of time the server is available Application Clients' use. |
| Available Compute | O | The maximum compute resource available for Application Clients |
| Available Graphical Compute | O | The maximum graphical compute resource available for Application Clients |
| Available Memory | O | The maximum memory resource available for Application Clients |
| Available Storage | O | The maximum storage resource available for Application Clients |
| Estimated Maximum Round-trip Delay with percentile | O | The estimated maximum round-trip delay time of a request and response packet between the server and any RAN node within the EAS service area (NOTE 3). |

TABLE 8.2.5-1-continued

Edge Application Server Service KPIs

| Information element | Status | Description |
|---|---|---|
| Round-trio Delay with percentile | | delay time of a request and response packet between the server and any RAN node within the EAS service area (NOTE 3). |

NOTE 1:
This response time only includes the processing time at the server and the time required by the server to consume 3GPP Core Network capabilities, if any.
NOTE 2:
The percentile gives the percentage of requests for which the estimated maximum response time is valid.
NOTE 3:
The percentile gives the percentage of packet round-trips for which the estimated maximum round-trip delay time is valid for any RAN node within the EAS service area.

Method to Determine the MEC Requirements

In the discovery process described in FIG. 8, before the APU can inform the SDU about the MEC requirements, the APU obtains the MEC requirements. The MEC requirements may be information such as the respective values for, e.g., compute capabilities, memory and storage. In some embodiments, these values may be 'hardcoded' in the application client installed on the UE. However, such a solution is not flexible. For example, if a new version of the application server software is deployed on the network side, this can result in a different set of requirements, e.g., higher compute capabilities or lower storage requirements.

Figure 14:
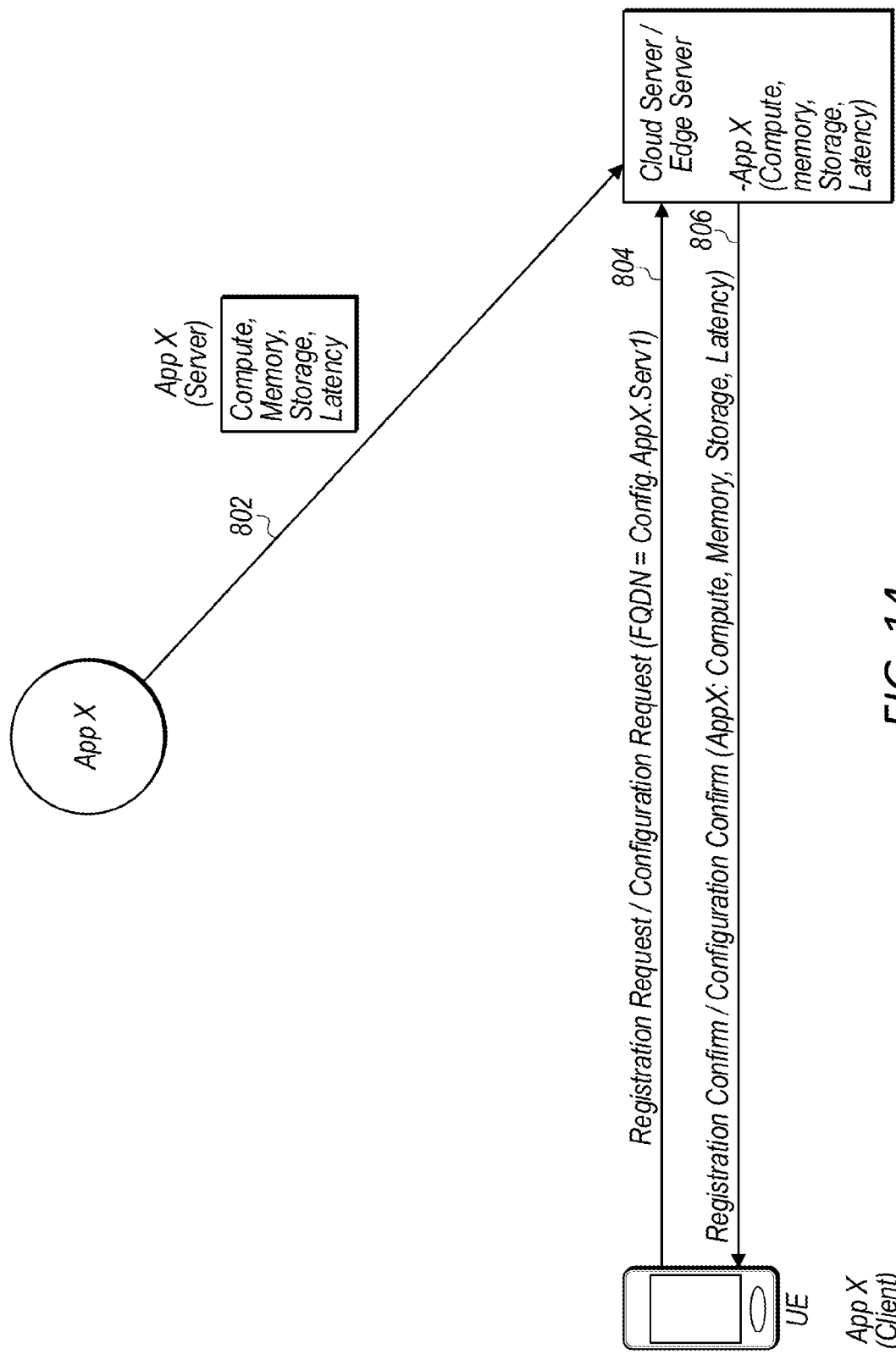
FIG. 14 illustrates a method which allows a UE to determine MEC requirements.

FIG. 14 illustrates one example method for allowing a UE to discover or obtain MEC requirements. In some embodiments, the UE can discover the MEC requirements by retrieving them from a server in the network: When the software package with the server application is deployed on the network side, then the MEC requirements (e.g. computation capabilities, memory, storage, etc.) may be provided to a server ("configuration server") on the network, as shown at 802. This can be a server in the cloud or an edge server. Furthermore, the server which stores the MEC requirement can be the server on which the server application itself is running or it can be a different server. The address of the configuration server may be provided to the UE, e.g., in the form of a fully qualified domain name (FQDN), for example "Config.AppX.Serv1", which is stored in the client application on the UE.

Subsequently, when the client application is started on the UE, at 804 the UE may send a Registration Request or Configuration Request message to the network using the FQDN of the configuration server as destination address. The network resolves the FQDN via a DNS query to the IP address of the configuration server. The configuration server then responds with a Registration Confirm or Configuration Confirm message at 806 including the parameters describing the MEC requirements. The UE can send this request, e.g., each time the application is started, or in regular intervals or upon receipt of a trigger message received from the server running the server application software.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving an edge computing availability request from a user equipment (UE), wherein the edge computing availability request includes information identifying the UE; and
   transmitting an edge computing availability reply to the UE in response to the edge computing availability request, wherein the edge computing availability reply includes information regarding available edge servers and site capability information,
   wherein the site capability information includes information regarding computation capabilities of one or more edge servers and a maximum response time between the UE and the one or more edge servers.

2. The method of claim 1, wherein the edge computing availability request includes information requesting availability of edge computing resources within a specified geographic area.

3. The method of claim 1, wherein the edge computing availability request includes information identifying an application executing on the UE.

4. The method of claim 3, further comprising:
   receiving information regarding two or more of channel conditions, cellular network parameters or application requirements of the application executing on the UE;
   dynamically determining whether a task of the application executing on the UE is to be offloaded to an edge server or executed locally on the UE, wherein the determination is based on the information; and
   transmitting the task of the application for offloaded execution on the edge server in response to a determination that the task of the application should be offloaded to the edge server.

5. The method of claim 4, wherein, in determining whether the task of the application executing on the UE is to be offloaded to the edge server or executed locally on the UE, the method further comprises:
   comparing a quality of experience for offloaded task execution and a quality of experience for local task execution.

6. The method of claim 4, wherein, in determining whether the task of the application executing on the UE is to be offloaded to the edge server or executed locally on the UE, the determination is based on three of channel conditions, cellular network parameters, UE power conditions, or application requirements.

7. The method of claim 4, wherein, in determining whether the task of the application executing on the UE is to be offloaded to the edge server or executed locally on the UE, the determination is based on channel conditions, cellular network parameters, UE power conditions, and application requirements.

8. A method, comprising:
   transmitting an edge computing availability request to a cellular network, wherein the edge computing availability request includes information identifying a user equipment (UE);
   receiving an edge computing availability reply from the cellular network in response to the edge computing availability request, wherein the edge computing availability reply includes information regarding available edge servers and site capability information; and
   determining a suitable edge server from the available edge servers that satisfies one or more application key performance indicators (KPIs), wherein the one or more application KPIs include a maximum response time between the UE and the suitable edge server.

9. The method of claim 8, wherein the edge computing availability request includes information requesting availability of edge computing resources within a specified geographic area.

10. The method of claim 8, further comprising:
    determining, based on the information regarding the one or more available edge servers and site capability information, one or more edge servers to which a task of an application is to be offloaded.

11. The method of claim 10, further comprising:
    transmitting a task of the application for offloaded execution on the suitable edge server; and
    transmitting a message including task parameters to one or more of the one or more available edge servers or the cellular network, wherein the task parameters include two or more of task priority, maximum response time requirements, periodicity or computational complexity.

12. The method of claim 10, further comprising:
    determining that a task of the application cannot be executed on an edge server or locally on the UE due to one or more of bad channel conditions or insufficient power levels at the UE,
    wherein the UE does not transmit the task of the application for offloaded execution on the edge server, and also does not execute the task locally on the UE, in response to a determination that the task cannot be executed on the edge server or locally on the UE.

13. The method of claim 12, wherein, in response to determining that the task cannot be executed on the edge server or locally on the UE, the method further comprises:
generating information used to allocate networking and computing resources at a future time for execution of the task.

14. The method of claim 8, further comprising:
receiving information regarding two or more of channel conditions, cellular network parameters or application requirements of an application executing on the UE; and
dynamically determining whether a task of the application executing on the UE is to be offloaded to an edge server or executed locally on the UE, wherein the determination is based on the information.

15. A baseband processor configured to cause a user equipment (UE) to:
transmit an edge computing availability request to a cellular network, wherein the edge computing availability request includes information identifying the UE;
receive an edge computing availability reply from the cellular network in response to the edge computing availability request, wherein the edge computing availability reply includes information regarding available edge servers and site capability information; and
determine a suitable edge server from the available edge servers that satisfies one or more application key performance indicators (KPIs), wherein the one or more application KPIs include a maximum response time between the UE and the suitable edge server.

16. The baseband processor of claim 15, wherein the baseband processor is further configured to:
receive information regarding two or more of channel conditions, cellular network parameters or application requirements of an application executing on the UE; and
dynamically determine whether a task of the application executing on the UE is to be offloaded to an edge server or executed locally on the UE, wherein the determination is based on the information.

17. The baseband processor of claim 16, wherein, in determining whether the task of the application executing on the UE is to be offloaded to the edge server or executed locally on the UE, the baseband processor is further configured to cause the UE to:
compare a quality of experience for offloaded task execution and a quality of experience for local task execution.

18. The baseband processor of claim 16, wherein the determination is based on three of channel conditions, cellular network parameters, UE power conditions, or application requirements.

19. The baseband processor of claim 15, wherein the baseband processor is further configured to cause the UE to:
determine that a task of an application cannot be executed on an edge server or locally on the UE due to one or more of bad channel conditions or insufficient power levels at the UE,
wherein the baseband processor does not transmit the task of the application for offloaded execution on the edge server, and wherein the baseband processor does not execute the task locally on the UE, in response to a determination that the task cannot be executed on the edge server or locally on the UE.

20. The baseband processor of claim 15, wherein the edge computing availability request includes information requesting availability of edge computing resources within a specified geographic area.

* * * * *